United States Patent
Johansson et al.

(10) Patent No.: US 12,090,937 B2
(45) Date of Patent: Sep. 17, 2024

(54) MOVING PART CONTROL SYSTEM AND METHOD FOR LOOSENING A MECHANICAL PART

(71) Applicants: Ningbo Geely Automobile Research & Development Co., Ltd., Ningbo (CN); Zhejiang Geely Holding Group Co., Ltd., Zhejiang (CN)

(72) Inventors: Jonathan Johansson, Gothenburg (SE); Albin Hagström, Lödöse (SE)

(73) Assignees: Ningbo Geely Automobile Res. & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 17 days.

(21) Appl. No.: 18/078,973

(22) Filed: Dec. 11, 2022

(65) Prior Publication Data

US 2023/0112774 A1   Apr. 13, 2023

Related U.S. Application Data (63) Continuation of application No. PCT/CN2021/109002, filed on Jul. 28, 2021.

(30) Foreign Application Priority Data

Aug. 26, 2020  (EP) .................................... 20192826

(51) Int. Cl.
- *B60R 16/023* (2006.01)
- *B60L 53/16* (2019.01)
- *B60R 16/027* (2006.01)

(52) U.S. Cl.
CPC .......... *B60R 16/0234* (2013.01); *B60L 53/16* (2019.02); *B60R 16/027* (2013.01)

(58) Field of Classification Search
CPC .... B60R 16/0234; B60R 16/027; B60L 53/16
See application file for complete search history.

(56) References Cited

U.S. PATENT DOCUMENTS

| | | | |
|---|---|---|---|
| 10,427,798 | B2 | 10/2019 | Snir |
| 2006/0212832 | A1 | 9/2006 | Obradovich |

(Continued)

FOREIGN PATENT DOCUMENTS

| | | | | |
|---|---|---|---|---|
| CN | 205846411 U | 12/2016 | | |
| CN | 109835206 A | * 6/2019 | ............. | Y02T 90/02 |

(Continued)

OTHER PUBLICATIONS

International Search Report from International Application No. PCT/CN2021/109002, mailed Oct. 26, 2021, 2 pages.

*Primary Examiner* — Jared Fureman
*Assistant Examiner* — Duc M Pham
(74) *Attorney, Agent, or Firm* — Tucker Ellis LLP (57) ABSTRACT

A moving part control system for a vehicle configured to cause a movement of a mechanical part for loosening the mechanical part from a stuck state to a loose state. The moving part control system includes an electrically controlled actuator device configured to cause a movement of the mechanical part, a processing circuitry configured to be operatively connected to the electrically controlled actuator device and configured to determine an amplitude and/or a frequency of an oscillating movement of the electrically controlled actuator device to determine if the mechanical part is in a stuck state or a loose state.

15 Claims, 6 Drawing Sheets

(56) References Cited

U.S. PATENT DOCUMENTS

| | | |
|---|---|---|
| 2018/0215280 A1 | 8/2018 | Lee |
| 2019/0234834 A1 | 8/2019 | Zhang |
| 2021/0222468 A1* | 7/2021 | Dong .................... E05B 63/22 |

FOREIGN PATENT DOCUMENTS

| | | |
|---|---|---|
| CN | 209738837 U | 12/2019 |
| CN | 210011614 U | 2/2020 |
| CN | 210230874 U | 4/2020 |
| DE | 202017106704 U1 | 11/2017 |
| EP | 2884634 A1 | 6/2015 |
| JP | 2011229303 A | 11/2011 |
| KR | 20190069721 A | 6/2019 |
| WO | 2016066212 A1 | 5/2016 |
| WO | 2019166234 A1 | 9/2019 |
| WO | 2019214935 A1 | 11/2019 |

* cited by examiner

MOVING PART CONTROL SYSTEM AND METHOD FOR LOOSENING A MECHANICAL PART

RELATED APPLICATION DATA

This application is a continuation of International Patent Application No. PCT/CN2021/109002, filed Jul. 28, 2021, which claims the benefit of European Patent Application No. 20192826.4, filed Aug. 26, 2020, the disclosures of which are incorporated herein by reference in their entireties.

TECHNICAL FIELD

The present disclosure relates to a moving part control system and method for a vehicle configured to cause a movement of a mechanical part for loosening the mechanical part from a stuck state to a loose state.

BACKGROUND

Mechanical parts at a vehicle, in particular movable parts including parts configured to be loosen, can sometimes get stuck due to e.g. ice, dust and rust etc.

In an example, a charging connector to a vehicle can sometimes get stuck due to ice when the temperature is below freezing during the winter season. There are also other mechanical parts that can get stuck. For example a detachable towbar that has not been used for a while can get dusty and stuck, and not released correctly when the towbar is desired to be in operation.

One problem with a mechanical part that is stuck, is that the operation and utility of the vehicle can get limited. If e.g. the charging connector of a charging cable gets stuck, the vehicle may not be operable at all, but instead has to remain parked until the charging connector can get loosened. In the other mentioned example, if the towbar of the vehicle malfunctions, the vehicle will not be able to tow a trailer etc.

Vehicles are equipped with plural different mechanical parts that are configured to be movable, e.g. go from a closed to an open state, or to be plugged or unplugged, locked or unlocked and rotate, etc. There are hence other examples of moving parts that can get stuck such as doors or hoods, sunroofs, mirrors and vehicle windshield wipers etc.

SUMMARY

It is an object of the present disclosure to mitigate, alleviate or eliminate one or more of the above-identified deficiencies and disadvantages and solve at least the above mentioned problems.

According to a first aspect there is provided a moving part control system for a vehicle configured to cause a movement of a mechanical part for loosening the mechanical part from a stuck state to a loose state. The moving part control system comprises an electrically controlled actuator device configured to cause a movement of the mechanical part, a processing circuitry configured to be operatively connected to the electrically controlled actuator device and configured to determine an amplitude and/or a frequency of an oscillating movement of the electrically controlled actuator device to determine if the mechanical part is in a stuck state or a loose state.

One advantage with this aspect is that the amplitude and/or frequency of the movement can indicate if the mechanical part is stuck or if the mechanical part is loose. In an example the amplitude can give an indication of the distance the electrically controlled actuator device is moving, and the frequency can give an indication of the speed of the oscillating movement.

According to some embodiments the moving part control system further comprises a movement sensor device configured to measure the amplitude and/or the frequency of an oscillating movement of the electrically controlled actuator device.

One advantage with this embodiment is that the amplitude and/or the frequency of the oscillating movement of the electrically controlled actuator device can be determined independently by the movement sensor device arranged at the electrically controlled actuator device.

According to some embodiments, the processing circuitry is further configured to determine a change in the amplitude and/or the frequency of the oscillating movement of the electrically controlled actuator device to determine if the movement of the mechanical part causes a transition from the stuck state to the loose state of the mechanical part.

One advantage with this embodiment is that the change in the amplitude and/or the frequency of the oscillating movement of the electrically controlled actuator device indicates that there is a change in how the mechanical part is moving and the movement is an indication of how stuck or loose the mechanical part is.

According to some embodiments, the processing circuitry is further configured to determine if the amplitude and/or the frequency of the oscillating movement of the electrically controlled actuator device is passing a predetermined threshold value indicative of that the mechanical part transitions from the stuck state to the loose state.

One advantage with this embodiment is that a predetermined threshold value of the amplitude and/or frequency can be used for understanding when the mechanical part is moving with a certain amplitude and/or a certain frequency that indicates that the mechanical part is in a loose state.

According to some embodiments, the processing circuitry is further configured to control the oscillating frequency of the electrically controlled actuator device to change the movement of the mechanical part.

One advantage with this embodiment is that the oscillating frequency of the electrically controlled actuator device can be maintained or set to at a certain frequency.

According to some embodiments, the processing circuitry is further configured to determine a desired oscillating frequency of the electrically controlled actuator device that causes a maximum movement of the mechanical part.

One advantage with this embodiment is that the oscillating frequency of the electrically controlled actuator device can be maintained or set to at a certain frequency that causes maximum movement of the mechanical part, and/or avoid a certain frequency that causes minimum movement of the mechanical part.

According to some embodiments, the processing circuitry is further configured to run the electrically controlled actuator device at a first oscillating frequency and determine a first amplitude of the movement of the electrically controlled actuator device at the first oscillating frequency, run the electrically controlled actuator device at a second oscillating frequency and determine a second amplitude of the movement of the electrically controlled actuator device at the second oscillating frequency, and determine which of the first oscillating frequency and the second oscillating frequency of the electrically controlled actuator device that causes the greatest amplitude in order to determine the desired oscillating frequency.

One advantage with this embodiment is that the oscillating frequency that causes maximum movement of the mechanical part can be found by comparing at least two frequencies. In an example all possible frequencies that can be set by the electrically controlled actuator device are compared in order to find the oscillating frequency of the electrically controlled actuator device that causes the greatest amplitude.

According to some embodiments, the mechanical part is any of a socket connector part, a plug connector part, a vehicle lock part, a vehicle door part, a vehicle sunroof part, a vehicle trunk part, a vehicle hood part, a vehicle mirror part, a vehicle towbar part, a vehicle brake part and a vehicle windshield wiper part.

According to a second aspect there is provided a method for loosening a mechanical part from a stuck state to a loose state. The method comprising the step of determining an amplitude and/or a frequency of an oscillating movement of an electrically controlled actuator device to determine if a mechanical part is in the stuck state or the loose state.

One advantage with this aspect is that the amplitude and/or frequency of the movement can indicate if the mechanical part is stuck or if the mechanical part is loose.

According to some embodiments, the method further comprises the step of determining a change in the amplitude and/or the frequency of the oscillating movement of the electrically controlled actuator device to determine if the movement of the mechanical part causes a transition from the stuck state to the loose state of the mechanical part.

One advantage with this embodiment is that the change in the amplitude and/or the frequency of the oscillating movement of the electrically controlled actuator device indicates that there is a change in how the mechanical part is moving and the movement is an indication of how stuck or loose the mechanical part is.

According to some embodiments, the method further comprises the step of determining if the amplitude and/or the frequency of the oscillating movement of the electrically controlled actuator device is passing a predetermined threshold value indicative of that the mechanical part transitions from the stuck state to the loose state.

One advantage with this embodiment is that a predetermined threshold value of the amplitude and/or frequency can be used for understanding when the mechanical part is moving with a certain amplitude and/or a certain frequency that indicates that the mechanical part is in a loose state.

According to some embodiments, the method further comprises the step of controlling the oscillating frequency of the electrically controlled actuator device to change the movement of the mechanical part.

One advantage with this embodiment is that the oscillating frequency of the electrically controlled actuator device can be maintained or set to at a certain frequency.

According to some embodiments, the method further comprises the step of determining a desired oscillating frequency of the electrically controlled actuator device that causes a maximum movement of the mechanical part.

One advantage with this embodiment is that the oscillating frequency of the electrically controlled actuator device can be maintained or set to at a certain frequency that causes maximum movement of the mechanical part, and/or avoid a certain frequency that causes minimum movement of the mechanical part.

According to some embodiments, the method further comprises the step of running the electrically controlled actuator device at a first oscillating frequency and determining a first amplitude of the movement of the electrically controlled actuator device at the first oscillating frequency. The method then further comprises the step of running the electrically controlled actuator device at a second oscillating frequency and determining a second amplitude of the movement of the electrically controlled actuator device at the second oscillating frequency, and the method then further comprises the step of and determining which of the first oscillating frequency and the second oscillating frequency of the electrically controlled actuator device that causes the greatest amplitude in order to determine the desired oscillating frequency.

One advantage with this embodiment is that the oscillating frequency that causes maximum movement of the mechanical part can be found by comparing at least two frequencies.

According to a third aspect there is provided a processing circuitry program product comprising a non-transitory processing circuitry readable medium, having thereon a processing circuitry program comprising program instructions, the processing circuitry program being loadable into a processing circuitry and configured to cause execution of the method when the processing circuitry program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

As mentioned in the background, mechanical parts at a vehicle, in particular movable parts and parts configured to be loosen, can sometimes get icy, rusty, corrosive, dry, sticky and/or dirty and get stuck. In an example, a charging connector to a vehicle can sometimes get stuck due to ice when the temperature is below freezing during the winter season. There are also other mechanical parts that can get stuck. For example a detachable towbar that has not been used for a while can get dusty and get stuck and not released correctly when the towbar is desired to be in operation. It is desired that all mechanical parts are operable when needed. The inventors have identified a system, method and a processing circuitry program product for loosening a mechanical part from a stuck state to a loose state.

The first aspect of this disclosure shows a moving part control system 100 for a vehicle configured to cause a movement of a mechanical part 20a, 20b, 20c for loosening the mechanical part 20a, 20b, 20c from a stuck state to a loose state.

According to some embodiments the mechanical part 20a, 20b, 20c is a socket connector part, a plug connector part, a vehicle lock part, a vehicle door part, a vehicle sunroof part, a vehicle trunk part, a vehicle hood part, a vehicle mirror part, a vehicle towbar part, a vehicle brake part, and a vehicle windshield wiper part.

According to some embodiments the mechanical part 20a, 20b, 20c is a charging connector part. According to some embodiments the mechanical part 20a, 20b, 20c is a charging plug part. According to some embodiments the mechanical part 20a, 20b, 20c is a charging socket part.

The moving part control system 100 comprises an electrically controlled actuator device 10a, 10b, 10c, 10d configured to cause a movement of the mechanical part 20a, 20b, 20c.

According to some embodiments the electrically controlled actuator device 10a, 10b, 10c, 10d is configured to cause the mechanical part 20a, 20b, 20c to oscillate for loosening the mechanical part 20a, 20b, 20c. According to some embodiments the electrically controlled actuator device 10a, 10b, 10c, 10d is arranged at the mechanical part 20a, 20b, 20c.

According to some embodiments a moving part of the electrically controlled actuator device 10a, 10b, 10c, 10d is oscillating. According to some embodiments the electrically controlled actuator device 10a, 10b, 10c, 10d is attached to the mechanical part 20a, 20b, 20c to cause a vibration of the mechanical part 20a, 20b, 20c.

According to some embodiments the electrically controlled actuator device 10a, 10b, 10c, 10d is physically connected to the mechanical part 20a, 20b, 20c. According to some embodiments the electrically controlled actuator device 10a, 10b, 10c, 10d is configured to cause a physical contact with the mechanical part 20a, 20b, 20c. According to some embodiments the electrically controlled actuator device 10a, 10b, 10c, 10d is further configured with a moving part that is in physical contact with the mechanical part 20a, 20b, 20c.

FIGS. 1A-1D illustrates different electrically controlled actuator devices according to an embodiment of the present disclosure.

Figure 1A:
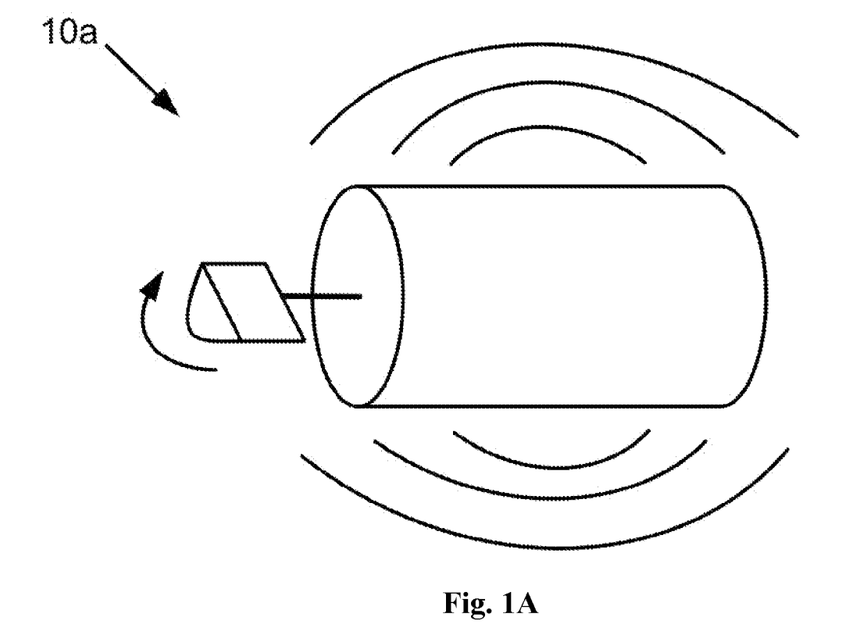
FIGS. 1A-1D illustrate different electrically controlled actuator devices according to an embodiment of the present disclosure.

According to some embodiments, as illustrated in FIG. 1A, the electrically controlled actuator device 10a is an electrical vibration motor. The electrical vibration motor is typically equipped with an object that is not balanced, and when the motor puts the object that is not balanced in rotation, a centripetal force will cause a vibration of the electrical vibration motor. In an example when the electrical vibration motor 10a is arranged at the mechanical part 20a, 20b, 20c, the centripetal force that causes a vibration of the electrical vibration motor will then hence also cause a vibration of the mechanical part 20a, 20b, 20c.

Figure 1B:
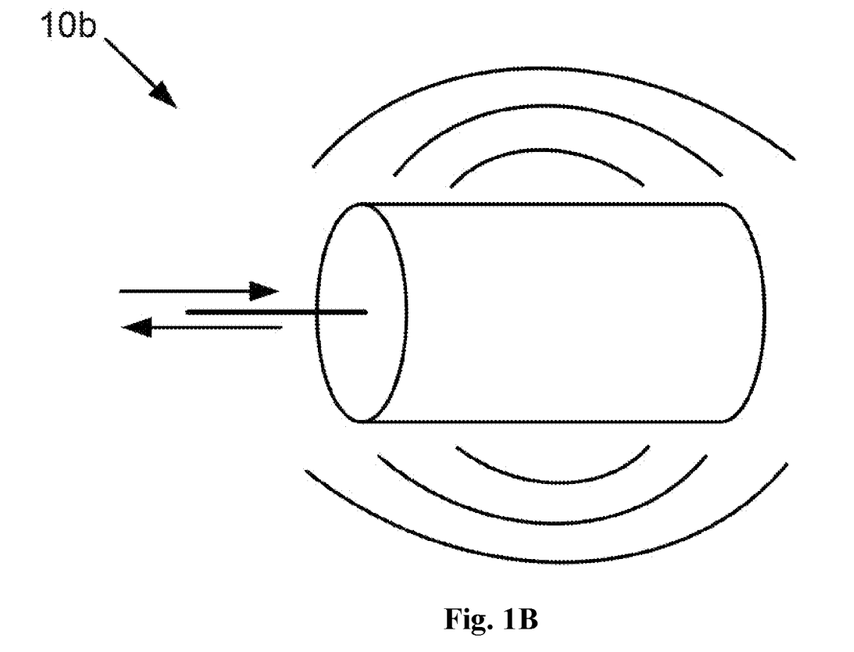

According to some embodiments, as illustrated in FIG. 1B, the electrically controlled actuator device 10b is configured with a moving part configured to cause a push and pull movement. In an example, the moving part configured to push and pull is an axis of an electrical motor. According to some embodiments the push and pull movement causes a vibration of the electrically controlled actuator device 10b. According to some embodiments the moving part of the electrically controlled actuator device 10b is arranged to push the mechanical part 20a, 20b, 20c. According to some embodiments the moving part of the electrically controlled actuator device 10b is configured to pull the mechanical part 20a, 20b, 20c.

Figure 1C:
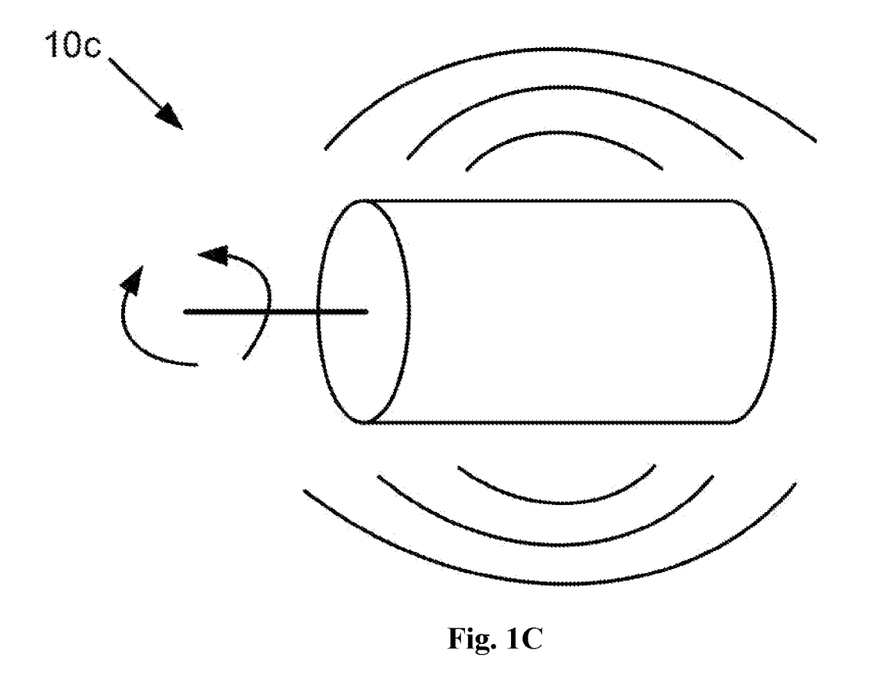

According to some embodiments, as illustrated in FIG. 1C, the electrically controlled actuator device 10c is an electrical motor configured to cause a torsion of an axis of the electrical motor. According to some embodiments the torsion of the electrically controlled actuator device 10c causes a torque onto the mechanical part 20a, 20b, 20c. According to some embodiments the torsion of the electrically controlled actuator device 10c cause a torque onto the mechanical part 20a, 20b, 20c. According to some embodiments the rotation direction of the axis is altered. According to some embodiments the altered rotation of the axis of the electrically controlled actuator device 10c causes a vibration the electrically controlled actuator device 10c. According to some embodiments the altered rotation of the axis of the electrically controlled actuator device 10c causes a vibration of the mechanical part 20a, 20b, 20c.

Figure 1D:
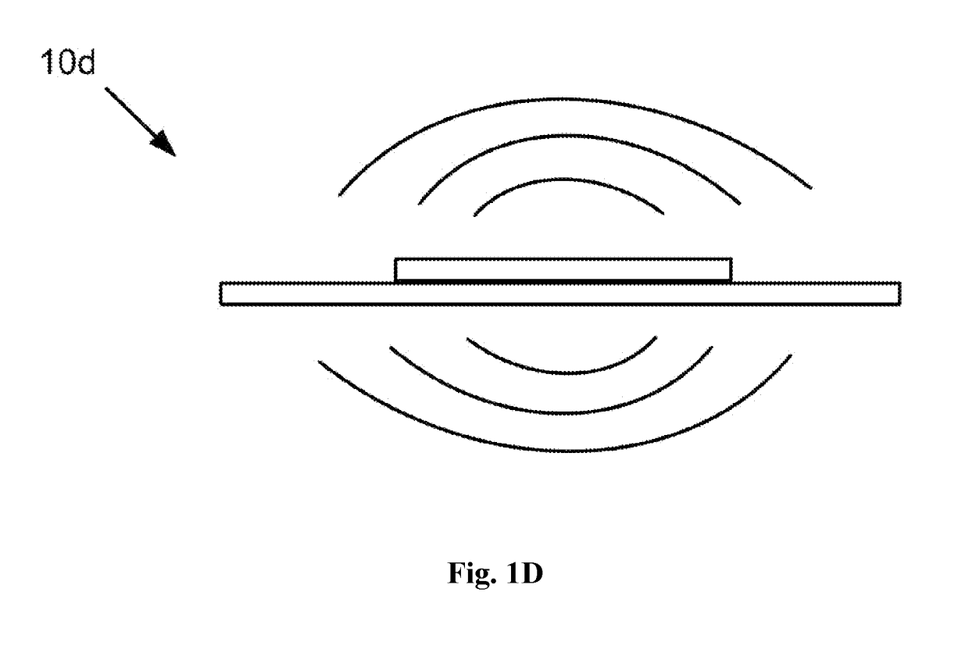

According to some embodiments, as illustrated in FIG. 1D, the electrically controlled actuator device 10d comprises a piezo electric element. According to some embodiments the piezo electric element is configured to vibrate when electrified. According to some embodiments the piezo electric element is configured to cause a vibration the electrically controlled actuator device 10d.

The moving part control system 100 further comprises a processing circuitry 102a, 102b, 102c configured to be operatively connected to the electrically controlled actuator device 10a, 10b, 10c, 10d and configured to determine an amplitude and/or a frequency of an oscillating movement of the electrically controlled actuator device 10a, 10b, 10c, 10d to determine if the mechanical part 20a, 20b, 20c is in a stuck state or a loose state.

According to some embodiments a small amplitude is an indication that the mechanical part 20a, 20b, 20c is in a stuck state. According to some embodiments a large amplitude is an indication that the mechanical part 20a, 20b, 20c is in a loose state.

According to some embodiments a low frequency is an indication that the mechanical part 20a, 20b, 20c is in a stuck state. According to some embodiments a high frequency is an indication that the mechanical part 20a, 20b, 20c, 20d is in a loose state.

According to some embodiments the determination of the amplitude of the oscillating movement is determined by measuring the power consumption of the actuator device 10a, 10b, 10c.

According to some embodiments the determination of the amplitude of the oscillating movement is determined by measuring the torque force and/or a traction force of a moving part of the actuator device 10a, 10b, 10c.

According to some embodiments the determination of the frequency of the oscillating movement is determined by measuring the revolutions per minute of the actuator device 10a, 10b, 10c.

One advantage with this aspect is that the amplitude and/or frequency of the movement can indicate if the mechanical part 20a, 20b, 20c is stuck or if the mechanical part 20a, 20b, 20c is loose. In an example the amplitude can give an indication of the distance the electrically controlled actuator device 10a, 10b, 10c, 10d is moving, and the frequency can give an indication of the speed of the oscillating movement.

Figure 2A:
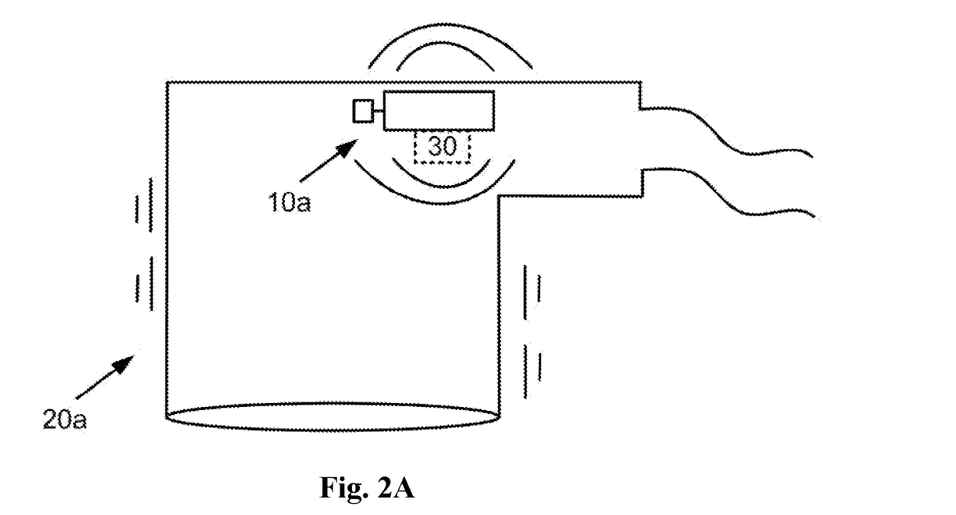
FIG. 2A illustrates a mechanical part with an electrically controlled actuator device according to an embodiment of the present disclosure.
Figure 2B:
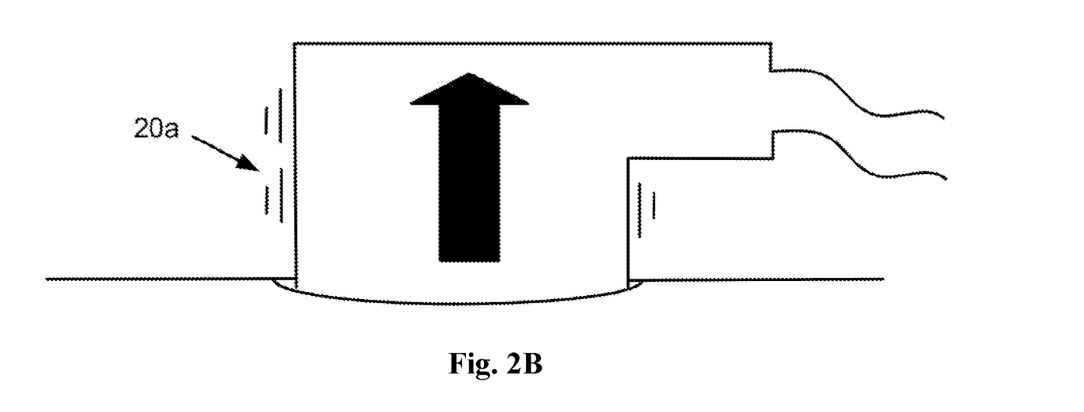
FIG. 2B illustrates movement and loosening of a mechanical part according to an embodiment of the present disclosure.
Figure 2C:
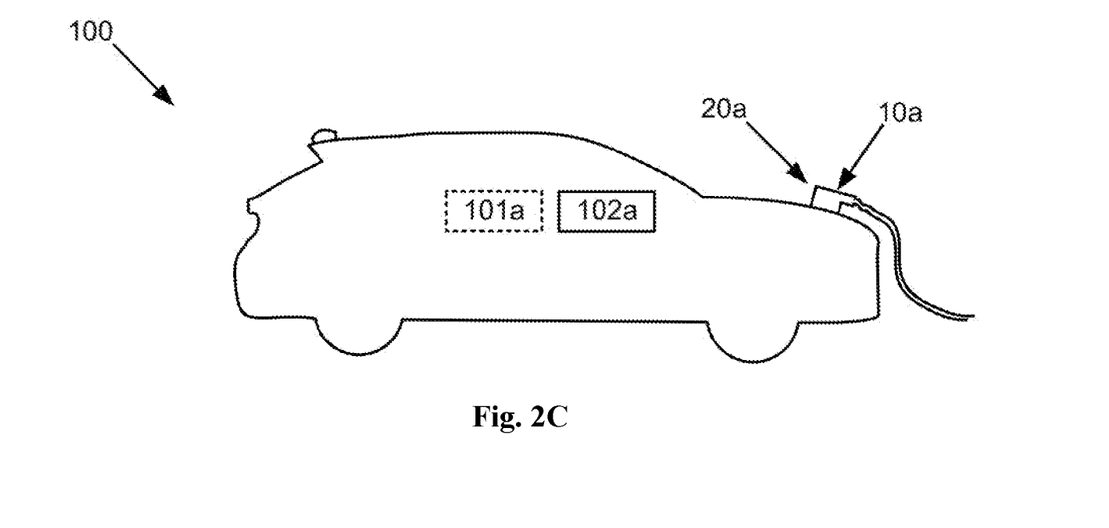
FIG. 2C illustrates a moving part control system for a vehicle according to an embodiment of the present disclosure.

According to some embodiments the processing circuitry 102a is the processing circuitry of an on-board vehicle computer as illustrated in FIG. 2C. According to some embodiments the processing circuitry 102b, 102c is comprised in an electronic device 801, 802 connected to the moving part control system 100 via a wireless communication network 60, as illustrated in FIG. 4C.

According to some embodiments the moving part control system 100 further comprises a memory 101a, 101b, 101c configured to store data. According to some embodiments the memory 101a is the memory of an on-board vehicle computer as illustrated in FIG. 2C. According to some embodiments the memory 101b, 101c is comprised in an electronic device 801, 802 connected to the moving part control system 100 via a wireless communication network 60, as illustrated in FIG. 4C.

Figure 4A:
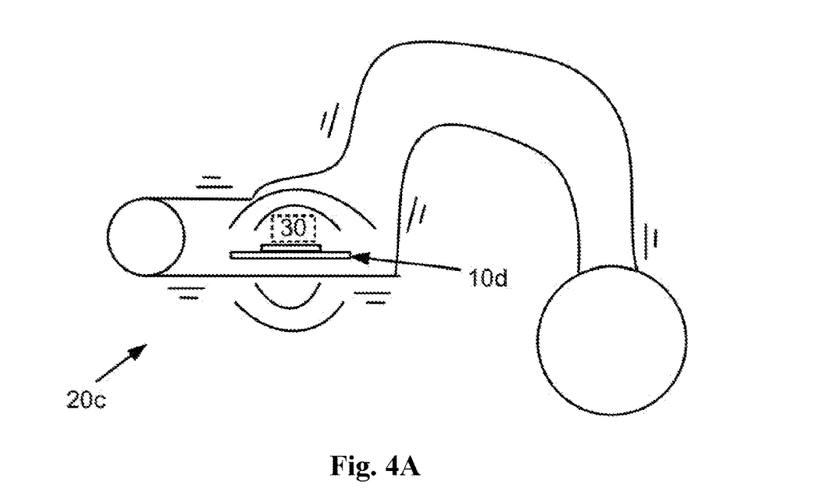
FIG. 4A illustrates a mechanical part with an electrically controlled actuator device according to an embodiment of the present disclosure.
Figure 4B:
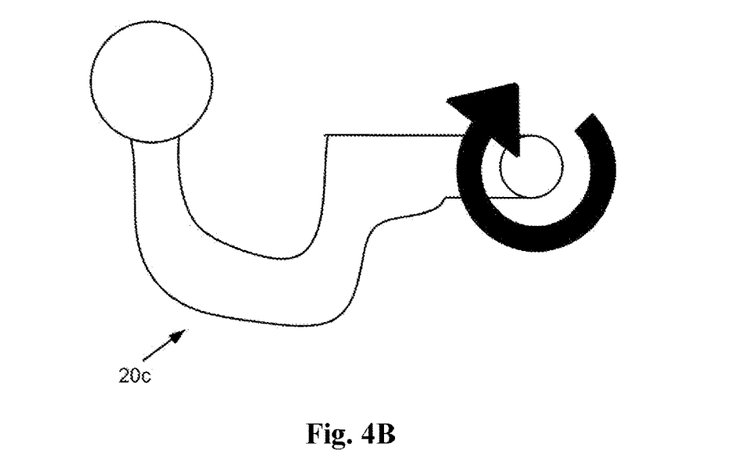
FIG. 4B illustrates loosening of a mechanical part according to an embodiment of the present disclosure.
Figure 4C:
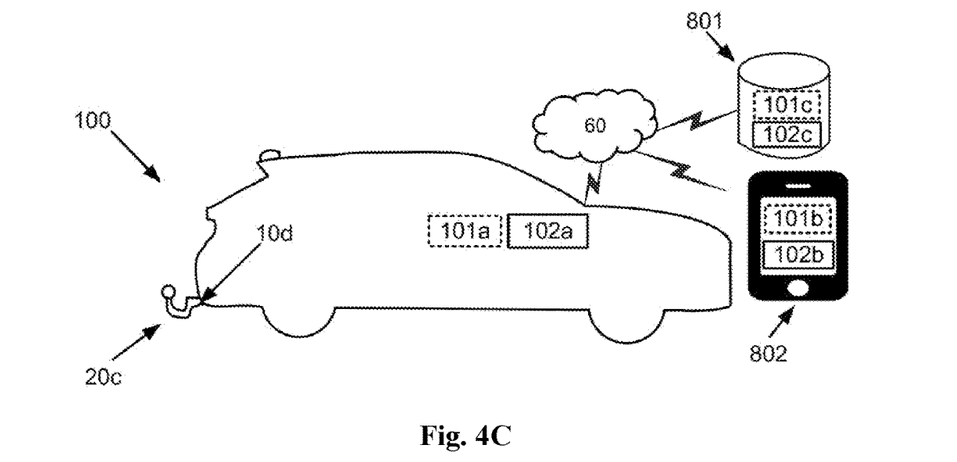
FIG. 4C illustrates a moving part control system for a vehicle according to an embodiment of the present disclosure.

In an example the electronic device 801, as illustrated in FIG. 4C, is a vehicle service system at the vehicle manufacturer and/or the vehicle service and repair center, using the moving part control system 100 to e.g. solve a problem for a vehicle user.

In an example the electronic device 802, as illustrated in FIG. 4C, is a portable electronic device used by the vehicle user, using the moving part control system 100 to e.g. prepare the vehicle for operation. In an example the vehicle user can start vibration of a charging plug connector from a smartphone, on the way to the vehicle a cold winter day.

In one example the wireless communication network 60, as illustrated in FIG. 2C is a standardized wireless local area network such as a Wireless Local Area Network, WLAN, Bluetooth™, ZigBee, Ultra-Wideband, Radio Frequency Identification, RFID, or similar network. In one example the wireless communication network 60 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments wireless communication network 60 can also be a combination of both a local area network and a wide area network. According to some embodiments the wireless communication network 60 is defined by common Internet Protocols.

According to some embodiments the moving part control system 100 further comprises a movement sensor device 30 configured to measure the amplitude and/or the frequency of an oscillating movement of the electrically controlled actuator device 10a, 10b, 10c, 10d.

According to some embodiments the processing circuitry 102a, 102b, 102c is configured to be operatively connected to the electrically controlled actuator device 10a, 10b, 10c, 10d and the movement sensor device 30.

According to some embodiments the movement sensor device 30 is any of an accelerometer or a gyro. According to some embodiments the movement sensor device 30 is configured to detect any movement such as an oscillating movement, a vibrating movement, a tilt movement, push movement, pull movement, etc. According to some embodiments the movement sensor device 30 is arranged at the electrically controlled actuator device 10a, 10b, 10c, 10d to measure the amplitude and/or the frequency of an oscillating movement of the electrically controlled actuator device 10a, 10b, 10c, 10d.

Figure 3A:
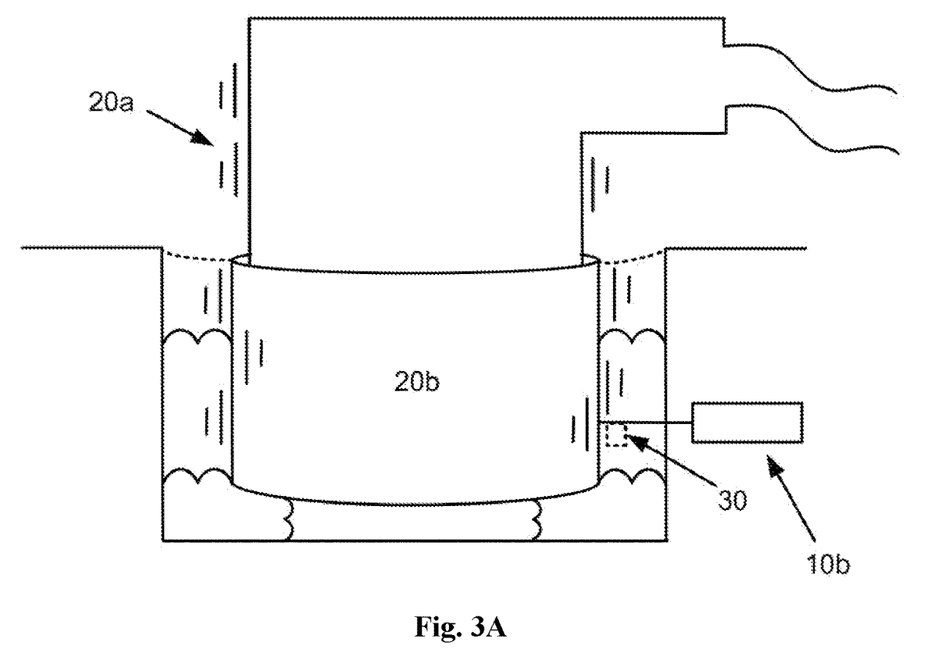
FIG. 3A illustrates a mechanical part with an electrically controlled actuator device according to an embodiment of the present disclosure.

FIGS. 2A, 3A, and 4A illustrates example embodiments when the movement sensor device 30 arranged at the electrically controlled actuator device 10a, 10b to measure the amplitude and/or the frequency of an oscillating movement of the electrically controlled actuator device 10a, 10b.

One advantage with this embodiment is that the amplitude and/or the frequency of the oscillating movement of the electrically controlled actuator device 10a, 10b, 10c, 10d can be determined independently by the movement sensor device 30 arranged at the electrically controlled actuator device 10a, 10b, 10c, 10d.

According to some embodiments the movement sensor device 30 is arranged at the mechanical part 20a, 20b, 20c to measure the amplitude and/or the frequency of an oscillating movement of the mechanical part 20a, 20b, 20c and the electrically controlled actuator device 10a, 10b, 10c, 10d.

According to some embodiments the processing circuitry 102a, 102b, 102c is configured to determine an amplitude and/or a frequency of an oscillating movement of the mechanical part 20a, 20b, 20c to determine if the mechanical part 20a, 20b, 20c is in a stuck state or a loose state.

FIG. 2A illustrates a mechanical part 20a with an electrically controlled actuator device 10a according to an embodiment of the present disclosure. In the example in FIG. 2A the mechanical part 20a is a plug connector part of a charging cable configured to be connected to a socket connector part at a vehicle as illustrated in FIG. 2C. In the illustration in FIG. 2A the electrically controlled actuator device 10a is an electrical vibration motor that causes a vibration of the plug connector part 20a. In an example the plug connector part 20a is icy due to temperatures below freezing an early winter morning. By determining the amplitude and/or the frequency of an oscillating movement of the electrical vibration motor 10a it can be determined if the plug connector part 20a is in a stuck state or a loose state.

FIG. 3A illustrates a mechanical part 20b with an electrically controlled actuator device 10b according to an embodiment of the present disclosure. In the example in FIG. 3A the mechanical part 20a is a is a socket connector part of a charging connection configured to receive a plug connector part 20a. In the illustration in FIG. 3A the electrically controlled actuator device 10b is configured with a moving part configured to cause a push and pull movement of the socket connector part 20a. In an example the socket connector part 20b is icy due to temperatures below freezing an early winter morning. By determining the amplitude and/or the frequency of an oscillating movement of the electrical vibration motor 10a it can be determined if the socket connector part 20b is in a stuck state or a loose state.

FIG. 4A illustrates a mechanical part 20c with an electrically controlled actuator device 10a according to an embodiment of the present disclosure. In the example in FIG. 4A the mechanical part 20c is a vehicle towbar part configured to be recessed into a cavity under the rear bumper to be hidden when not in use. In the illustration in FIG. 4A the electrically controlled actuator device 10d is a piezo electric element that causes a vibration of the vehicle towbar part 20c. In an example the vehicle towbar part 20c is dusty due to that the vehicle towbar part 20c has not been used for a long period. By determining the amplitude and/or the frequency of an oscillating movement of the piezo electric element 10d it can be determined if the vehicle towbar part 20c is in a stuck state or a loose state.

According to some embodiments the determination if the mechanical part 20a, 20b, 20c is in a stuck state or a loose state is determined before activation of a function associated with movement of the mechanical part 20a, 20b, 20c. In an example, it can be determined if the mechanical part 20a, 20b, 20c is in a stuck state or a loose state before using the vehicle in order to know the condition of a function of the vehicle. In an example a vehicle user can be notified e.g. via an electronic device 802 connected to the moving part control system 100 via a wireless communication network 60 if the mechanical part 20a, 20b, 20c is in a stuck state or a loose state. In an example the moving part control system 100 can be configured to check if the mechanical part 20a, 20b, 20c is in a stuck state or a loose state upon request by a vehicle user, e.g. via an electronic device 802 connected to the moving part control system 100 via a wireless communication network 60.

According to some embodiments the processing circuitry 102a, 102b, 102c is further configured to activate the electrically controlled actuator device 10a, 10b, 10c, 10d when the vehicle is started. According to some embodiments the processing circuitry 102a, 102b, 102c is further configured to activate the electrically controlled actuator device 10a, 10b, 10c, 10d based on any of the time of the year, the outside temperature and the geographical location of the vehicle. According to some embodiments the processing circuitry 102a, 102b, 102c is further configured to activate the electrically controlled actuator device 10a, 10b, 10c, 10d based on a control signal received from an electronic device 801, 802 connected to the moving part control system 100 via a wireless communication network 60. According to some embodiments the control signal is received from another vehicle in the vicinity of the vehicle.

According to some embodiments the processing circuitry 102a, 102b, 102c is further configured to determine a change in the amplitude and/or the frequency of the oscillating movement of the electrically controlled actuator device 10a, 10b, 10c, 10d to determine if the movement of the mechanical part 20a, 20b, 20c causes a transition from the stuck state to the loose state of the mechanical part 20a, 20b, 20c.

One advantage with this embodiment is that the change in the amplitude and/or the frequency of the oscillating movement of the electrically controlled actuator device 10a, 10b, 10c, 10d indicates that there is a change in how the mechanical part 20a, 20b, 20c is moving and the movement is an indication of how stuck or loose the mechanical part 20a, 20b, 20c is.

In an example, the oscillating movement of the electrically controlled actuator device 10a, 10b, 10c, 10d causes a loosening of the mechanical part 20a, 20b, 20c, and over time the oscillating movement of the electrically controlled actuator device 10a, 10b, 10c, 10d causes a change in the state of the mechanical part 20a, 20b, 20c.

According to some embodiments the processing circuitry 102a, 102b, 102c is further configured to determine if the amplitude and/or the frequency of the oscillating movement of the electrically controlled actuator device 10a, 10b, 10c, 10d is passing a predetermined threshold value indicative of that the mechanical part 20a, 20b, 20c transitions from the stuck state to the loose state.

One advantage with this embodiment is that a predetermined threshold value of the amplitude and/or frequency can be used for understanding when the mechanical part 20a, 20b, 20c is moving with a certain amplitude and/or a certain frequency that indicates that the mechanical part 20a, 20b, 20c is in a loose state.

In an example the predetermined threshold value is determined during plural tests at different conditions to learn at what amplitude and/or frequency the mechanical part 20a, 20b, 20c transitions from the stuck state to the loose state. In an example, different amount of water, moist or dust at different temperatures for a certain mechanical part 20a, 20b, 20c is used for determining the threshold value.

Figure 5:
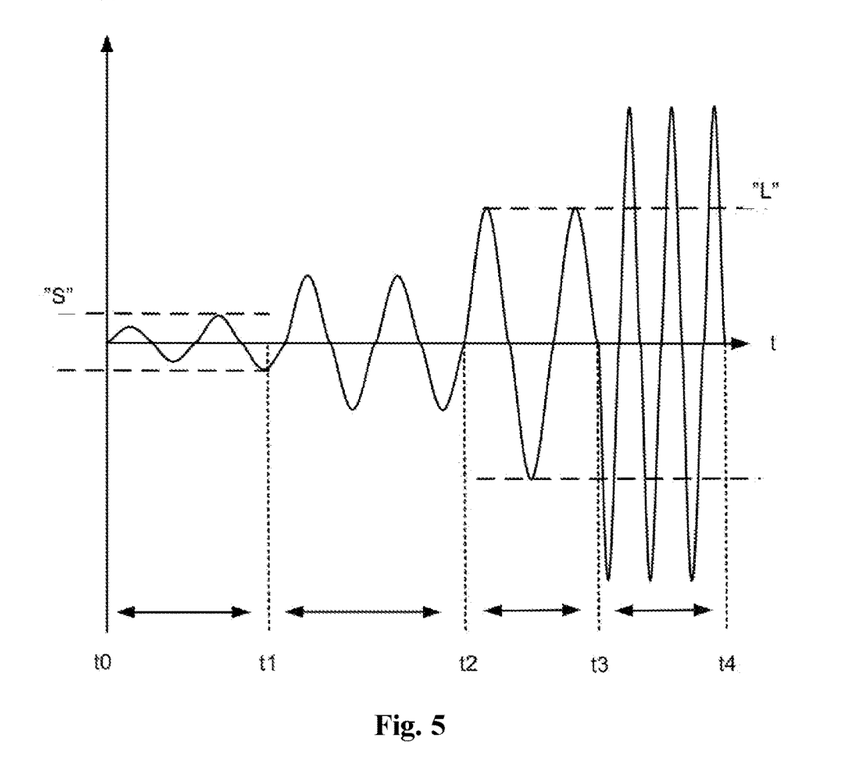
FIG. 5 illustrates an example graph of different amplitudes and different frequencies of an oscillating movement of an electrically controlled actuator device according to an embodiment of the present disclosure.

FIG. 5 illustrates an example graph of different amplitudes and different frequencies of an oscillating movement of an electrically controlled actuator device 10a, 10b, 10c, 10d according to an embodiment of the present disclosure. The graph in FIG. 5 has a y-axis representing the amplitude "A" and a x-axis representing the time "t". The curve in FIG. 5 describes the oscillation over time. The frequency is the number of oscillations over time. In the example oscillation as illustrated in FIG. 5, the oscillation is low, and the amplitude is also low in the time period from t0 to t1. In the example, it is determined that the mechanical part 20a, 20b, 20c is in a stuck state during this period by determining that the amplitude is below a predefined threshold value "S". Over time, while maintaining the electrically controlled actuator device 10*a*, 10*b*, 10*c* active causing a movement of the mechanical part 20*a*, 20*b*, 20*c*, the oscillating movement of the electrically controlled actuator device 10*a*, 10*b*, 10*c*, 10*d* causes a change in the state of the mechanical part 20*a*, 20*b*, 20*c*. In the example, the amplitude is increasing in the time period t1 to t2. During the time period t2 to t3 the amplitude is increasing further and at the time t3 both the amplitude and the frequency is increasing. In the example, it is determined that the mechanical part 20*a*, 20*b*, 20*c* is in a loose state during time period t3 to t4 by determining that the amplitude is above a predefined threshold value "L".

The curve in FIG. 5 is an example curve and different mechanical parts 20*a*, 20*b*, 20*c* may be determined to be in a stuck state or a loose state at different frequencies, and at different amplitudes.

According to some embodiments the electrically controlled actuator device 10*a*, 10*b*, 10*c* is inactivated in a determination that the mechanical part 20*a*, 20*b*, 20*c* is in a loose state.

In the example illustration in FIG. 2B the mechanical part 20*a* is a plug connector part of a charging cable configured to be connected to a socket connector part at a vehicle. In a determination that the plug connector part 20*a* is in a loose state the plug connector part 20*a* can easily be unplugged. In the example the vehicle can hence be operable since the plug connector part 20*a* is no longer stuck in the socket connector part at the vehicle.

According to some embodiments a first mechanical part movable attached to a second mechanical part is determined to be in a loose state in accordance with a determination that the second mechanical part has been in a loose state during a predefined time period while maintaining the oscillating frequency of the electrically controlled actuator device 10*a*, 10*b*, 10*c*, 10*d*.

Figure 3B:
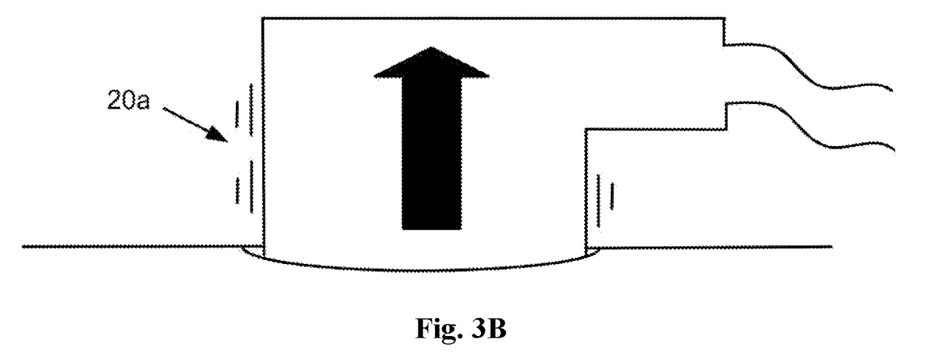
FIG. 3B illustrates movement and loosening of a mechanical part according to an embodiment of the present disclosure.
Figure 3C:
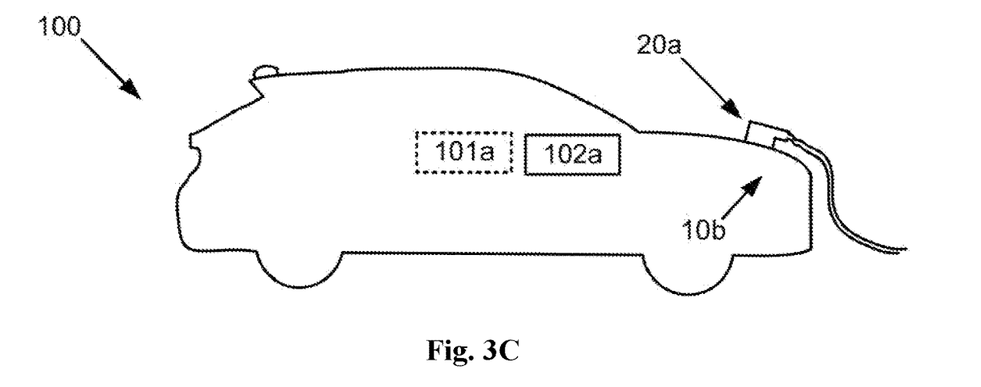
FIG. 3C illustrates a moving part control system for a vehicle according to an embodiment of the present disclosure.

In an example, with reference to FIGS. 3A and 3B, it is determined that the socket connector part 20*b* of the charging connection configured to receive the plug connector part 20*a*, is in a loose state and that the plug connector part 20*a*, received in the socket connector part 20*b*, is determined to be in a loose state after a predetermined time period of oscillating movement above the predefined threshold value indicative of that socket connector part 20*b* transitions from the stuck state to the loose state. In the example, with reference to FIG. 5, the predetermined time period is illustrated as the time period from t3 to t4. In a determination that the plug connector part 20*a* and the socket connector part 20*b* are both in a loose state the plug connector part 20*a* can be unplugged from the socket connector part 20*b*.

In the example illustration in FIG. 4B the mechanical part 20*c* is a vehicle towbar part configured to be recessed into a cavity under the rear bumper to be hidden when not in use. In a determination that the vehicle towbar part 20*c* is in a loose state, the vehicle towbar part 20*c* can move from the recess to a position for towing a trailer. In the example, the vehicle can hence be operable since the vehicle towbar part 20*c* is no longer stuck in the recess.

According to some embodiments the processing circuitry 102*a*, 102*b*, 102*c* is further configured to control the oscillating frequency of the electrically controlled actuator device 10*a*, 10*b*, 10*c*, 10*d* to change the movement of the mechanical part 20*a*, 20*b*, 20*c*.

According to some embodiments the oscillating frequency is controlled by the revolutions per minute of the electrically controlled actuator device 10*a*, 10*b*, 10*c*. According to some embodiments the oscillating frequency is controlled by the power supply to the electrically controlled actuator device 10*a*, 10*b*, 10*c*, 10*d*.

One advantage with this embodiment is that the oscillating frequency of the electrically controlled actuator device can be maintained or set to at a certain frequency.

According to some embodiments the processing circuitry 102*a*, 102*b*, 102*c* is further configured to determine a desired oscillating frequency of the electrically controlled actuator device 10*a*, 10*b*, 10*c*, 10*d* that causes a maximum movement of the mechanical part 20*a*, 20*b*, 20*c*.

One advantage with this embodiment is that the oscillating frequency of the electrically controlled actuator device 10*a*, 10*b*, 10*c*, 10*d* can be maintained or set to at a certain frequency that causes maximum movement of the mechanical part 20*a*, 20*b*, 20*c*, and/or avoid a certain frequency that causes minimum movement of the mechanical part 20*a*, 20*b*, 20*c*.

According to some embodiments the processing circuitry 102*a*, 102*b*, 102*c* is further configured to run the electrically controlled actuator device 10*a*, 10*b*, 10*c*, 10*d* at a first oscillating frequency and determine a first amplitude of the movement of the electrically controlled actuator device 10*a*, 10*b*, 10*c*, 10*d* at the first oscillating frequency, run the electrically controlled actuator device 10*a*, 10*b*, 10*c*, 10*d* at a second oscillating frequency and determine a second amplitude of the movement of the electrically controlled actuator device 10*a*, 10*b*, 10*c*, 10*d* at the second oscillating frequency, and determine which of the first oscillating frequency and the second oscillating frequency of the electrically controlled actuator device 10*a*, 10*b*, 10*c*, 10*d* that causes the greatest amplitude in order to determine the desired oscillating frequency.

One advantage with this embodiment is that the oscillating frequency that causes maximum movement of the mechanical part 20*a*, 20*b*, 20*c* can be found by comparing at least two frequencies. In an example, all possible frequencies that can be set by the electrically controlled actuator device 10*a*, 10*b*, 10*c*, 10*d* are compared in order to find the oscillating frequency of the electrically controlled actuator device 10*a*, 10*b*, 10*c*, 10*d* that causes the greatest amplitude.

According to some embodiments an oscillating frequency that causes maximum movement of the mechanical part 20*a*, 20*b*, 20*c* is associated with an antinode of a standing wave caused by the oscillating movement of the electrically controlled actuator device 10*a*, 10*b*, 10*c*, 10*d*.

According to some embodiments the processing circuitry 102*a*, 102*b*, 102*c* is further configured to determine the desired oscillating frequency in accordance with a change in the amplitude in order to find a new oscillating frequency of the electrically controlled actuator device 10*a*, 10*b*, 10*c*, 10*d* that causes the greatest amplitude.

According to some embodiments the processing circuitry 102*a*, 102*b*, 102*c* is further configured to continuously determine the desired oscillating frequency in order to continuously find the oscillating frequency of the electrically controlled actuator device 10*a*, 10*b*, 10*c*, 10*d* that causes the greatest amplitude.

According to some embodiments the electrically controlled actuator device 10*a*, 10*b*, 10*c*, 10*d* is configured to generate oscillating movement at frequencies within a predefined range of frequencies. In an example an electrically controlled actuator device 10*a*, 10*b*, 10*c*, 10*d* is configured to operable between 200 Hz to 8000 Hz. In an example the processing circuitry 102*a*, 102*b*, 102*c* determines that the frequency 230 Hz causes the greatest amplitude and the actuator device 10*a*, 10*b*, 10*c*, 10*d* is controlled to generate oscillating movement at 230 Hz. In an example the amplitude changes and the processing circuitry 102*a*, 102*b*, 102*c* determines that the frequency 5950 Hz causes the greatest amplitude, and the actuator device 10a, 10b, 10c, 10d is controlled to change generation of a oscillating movement from 230 Hz to 5950 Hz.

According to some embodiments the mechanical part 20a, 20b, 20c is any of a socket connector part, is a plug connector part, a vehicle lock part, a vehicle door part, a vehicle sunroof part, a vehicle trunk part, a vehicle hood part, a vehicle mirror part, a vehicle towbar part, a vehicle brake part and a vehicle windshield wiper part.

Figure 6:
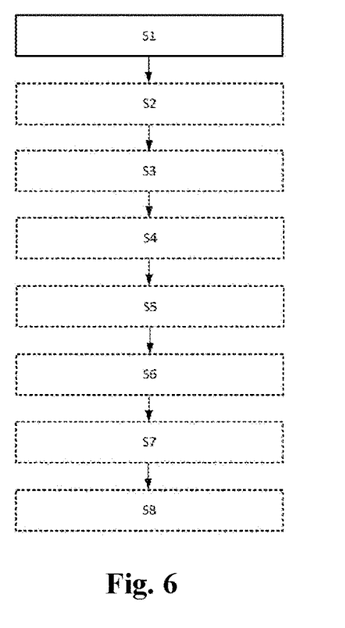
FIG. 6 illustrates a flow chart of the method steps according to the second aspect of the disclosure.

The second aspect of this disclosure shows a method for loosening a mechanical part 20a, 20b, 20c from a stuck state to a loose state. FIG. 6 illustrates a flow chart of the method steps according to the second aspect of the disclosure.

The method comprising the step of S1 determining an amplitude and/or a frequency of an oscillating movement of an electrically controlled actuator device 10a, 10b, 10c, 10d to determine if a mechanical part 20a, 20b, 20c is in the stuck state or the loose state.

One advantage with this aspect is that the amplitude and/or frequency of the movement can indicate if the mechanical part is stuck or if the mechanical part is loose.

According to some embodiments the method further comprising the step of S2 determining a change in the amplitude and/or the frequency of the oscillating movement of the electrically controlled actuator device 10a, 10b, 10c, 10d to determine if the movement of the mechanical part 20a, 20b, 20c causes a transition from the stuck state to the loose state of the mechanical part 20a, 20b, 20c.

One advantage with this embodiment is that the change in the amplitude and/or the frequency of the oscillating movement of the electrically controlled actuator device indicates that there is a change in how the mechanical part is moving and the movement is an indication of how stuck or loose the mechanical part is.

According to some embodiments the method comprises the step of S3 determining if the amplitude and/or the frequency of the oscillating movement of the electrically controlled actuator device 10a, 10b, 10c, 10d is passing a predetermined threshold value indicative of that the mechanical part 20a, 20b, 20c transitions from the stuck state to the loose state.

One advantage with this embodiment is that a predetermined threshold value of the amplitude and/or frequency can be used for understanding when the mechanical part is moving with a certain amplitude and/or a certain frequency that indicates that the mechanical part is in a loose state.

According to some embodiments the method comprises the step of S4 controlling the oscillating frequency of the electrically controlled actuator device 10a, 10b, 10c, 10d to change the movement of the mechanical part 20a, 20b, 20c.

One advantage with this embodiment is that the oscillating frequency of the electrically controlled actuator device can be maintained or set to at a certain frequency.

According to some embodiments the method comprises the step of S5 determining a desired oscillating frequency of the electrically controlled actuator device 10a, 10b, 10c, 10d that causes a maximum movement of the mechanical part 20a, 20b, 20c.

One advantage with this embodiment is that the oscillating frequency of the electrically controlled actuator device can be maintained or set to at a certain frequency that causes maximum movement of the mechanical part, and/or avoid a certain frequency that causes minimum movement of the mechanical part.

According to some embodiments the method comprises the step of S6 running the electrically controlled actuator device 10a, 10b, 10c, 10d at a first oscillating frequency and determining a first amplitude of the movement of the electrically controlled actuator device 10a, 10b, 10c, 10d at the first oscillating frequency, the step of S7 running the electrically controlled actuator device 10a, 10b, 10c, 10d at a second oscillating frequency and determining a second amplitude of the movement of the electrically controlled actuator device 10a, 10b, 10c, 10d at the second oscillating frequency, and the step of S8 determining which of the first oscillating frequency and the second oscillating frequency of the electrically controlled actuator device 10a, 10b, 10c, 10d that causes the greatest amplitude in order to determine the desired oscillating frequency.

One advantage with this embodiment is that the oscillating frequency that causes maximum movement of the mechanical part can be found by comparing at least two frequencies.

Figure 7:
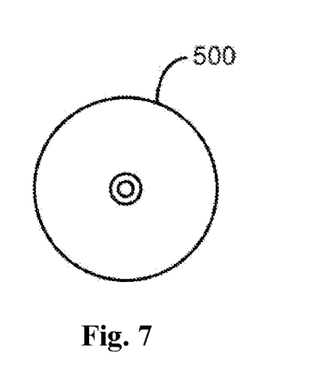
FIG. 7 illustrates a computer program product according to the third aspect of the disclosure.

The third aspect of this disclosure shows a processing circuitry program product of the method according to the second aspect, comprising a non-transitory processing circuitry readable medium, having thereon a processing circuitry program comprising program instructions, the processing circuitry program being loadable into a processing circuitry 102a, 102b, 102c and configured to cause execution of the method when the processing circuitry program is run by the at least one processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claims, and from a study of the drawings, the disclosure, and the appended claims.

What is claimed is:

1. A moving part control system for a vehicle configured to cause a movement of a mechanical part for loosening the mechanical part from a stuck state to a loose state, the moving part control system comprises:
    an electrically controlled actuator device that is physically coupled to the mechanical part and that produces an oscillating movement that vibrates the mechanical part;
    a processing circuitry operatively connected to the electrically controlled actuator device and that:
        determines at least one of an amplitude or a frequency of the oscillating movement; and
        determines, from the determined at least one of the amplitude or the frequency, that the mechanical part is in a stuck state or a loose state.

2. The moving part control system according to claim 1 further comprises:
    a movement sensor device that measures the at least one of the amplitude or the frequency of the oscillating movement of the electrically controlled actuator device.

3. The moving part control system according to claim 1, wherein the processing circuitry detects a change in the at least one of the amplitude or the frequency of the oscillating movement of the electrically controlled actuator device that indicates that the vibration of the mechanical part caused a transition from the stuck state to the loose state of the mechanical part.

4. The moving part control system according to claim 1, wherein the processing circuitry determines that the at least one of the amplitude or the frequency of the oscillating movement of the electrically controlled actuator device passes a predetermined threshold value indicative that the mechanical part transitions from the stuck state to the loose state.

5. The moving part control system according to claim 1, wherein the processing circuitry controls an oscillating frequency of the electrically controlled actuator device to change the vibration of the mechanical part.

6. The moving part control system according to claim 1, wherein the processing circuitry determines a desired oscillating frequency of the electrically controlled actuator device that causes a maximum movement of the mechanical part.

7. The moving part control system according to claim 1, wherein the processing circuitry is further configured to:
 run the electrically controlled actuator device at a first oscillating frequency and determine a first amplitude of the oscillating movement of the electrically controlled actuator device at the first oscillating frequency;
 run the electrically controlled actuator device at a second oscillating frequency and determine a second amplitude of the oscillating movement of the electrically controlled actuator device at the second oscillating frequency; and
 determine which of the first oscillating frequency and the second oscillating frequency of the electrically controlled actuator device causes a greater amplitude in order to determine a desired oscillating frequency.

8. The moving part control system according to claim 1, wherein the mechanical part is any of a socket connector part; a plug connector part; a vehicle lock part; a vehicle door part; a vehicle sunroof part; a vehicle trunk part; a vehicle hood part; a vehicle mirror part; a vehicle towbar part; a vehicle brake part or a vehicle windshield wiper part.

9. A method for loosening a mechanical part from a stuck state to a loose state, the method comprising:
 driving an electrically controlled actuator device that is physically coupled to the mechanical part to produce an oscillating movement that vibrates the mechanical part;
 determining at least one of an amplitude or a frequency of the oscillating movement; and
 determining, from the determined at least one of the amplitude or the frequency, that the mechanical part is in the stuck state or the loose state.

10. The method according to claim 9 further comprising:
 detecting a change in the at least one of the amplitude or the frequency of the oscillating movement of the electrically controlled actuator device that indicates that the vibration of the mechanical part caused a transition from the stuck state to the loose state of the mechanical part.

11. The method according to claim 9, comprising:
 determining that the at least one of the amplitude or the frequency of the oscillating movement of the electrically controlled actuator device passes a predetermined threshold value indicative that the mechanical part transitions from the stuck state to the loose state.

12. The method according to claim 9, further comprising:
 controlling an oscillating frequency of the electrically controlled actuator device to change the vibration of the mechanical part.

13. The method according to claim 9, further comprising:
 determining a desired oscillating frequency of the electrically controlled actuator device that causes a maximum movement of the mechanical part.

14. The method according to claim 9, further comprising:
 running the electrically controlled actuator device at a first oscillating frequency and determining a first amplitude of the oscillating movement of the electrically controlled actuator device at the first oscillating frequency;
 running the electrically controlled actuator device at a second oscillating frequency and determining a second amplitude of the oscillating movement of the electrically controlled actuator device at the second oscillating frequency; and
 determining which of the first oscillating frequency and the second oscillating frequency of the electrically controlled actuator device causes a greater amplitude in order to determine a desired oscillating frequency.

15. A non-transitory machine readable medium having stored thereon a processing circuitry program comprising program instructions, the processing circuitry program being loadable into a processing circuitry and configured to cause execution of the method according to claim 9 when the processing circuitry program is run by the processing circuitry.

* * * * *